United States Patent Office 3,527,558
Patented Sept. 8, 1970

3,527,558
PROCESS FOR TREATING CELLULOSIC TEXTILES
Charles Tomasino and Ray S. Smith, Greensboro, N.C., assignors to Burlington Industries, Inc., Greensboro, N.C., a corporation of Delaware
No Drawing. Filed Jan. 18, 1966, Ser. No. 521,443
Int. Cl. D06m *13/34*
U.S. Cl. 8—116.2
2 Claims

ABSTRACT OF THE DISCLOSURE

A process for imparting durable press effects to cellulosic-containing fabrics and especially garments with a curable resin in which a curing agent is used which is catalytically inactive in the dry unhydrolyzed state, the fabric being heated to effect the cure while initially moist enough to hydrolyze the curing agent and liberate a strong acid catalyst but being dried during the process and the catalyst reverting to inactive curing agent on return to ambient conditions. The curing agent is a hydrolyzable amine or imine salt of the strong acid catalyst.

---

The present invention relates to certain improvements in the treatment of cellulosic textiles with curable resins or reactants for the purpose of obtaining durable finish or surface effects. The invention is of particular importance in the production of so-called permanent press garments but other important areas of application, e.g. the preparation of flat goods having wash-wear properties, will also be hereinafter apparent.

The invention offers a number of unique advantages over prior art methods for obtaining durable finish effects on cellulosic textiles. One important advantage of the invention is that it makes possible simultaneous press-cure operations for the preparation of permanent press garments. To date, the only commercially significant procedures for preparing permanent press garments have required a separate curing operation following pressing. This separate curing step is time-consuming and otherwise undesirable, particularly since it requires the use of expensive curing ovens. It has been recognized that a process involving a simultaneous press-cure would be preferred but because of various problems, particularly those inherent in catalysts which might be used to bring about curing under the relatively low temperature conditions prevailing in the normal pressing operation, no such process has previously been developed which could be effectively used on a commercial basis. One such process has been described in U.S. Pat. 2,950,553 but the resulting product has not been commercially acceptable. Accordingly, there is still a real need in the art for a useful simultaneous press-cure process. The present invention effectively fulfills this need by providing a product which is highly desirable and commercially acceptable. These results are unexpected, particularly since important features of the invention go contrary to prior teachings, including 2,950,553.

While the present invention is uniquely useful for simultaneous press-cure operations, it may also be used to advantage in permanent press procedures involving a post-curing operation after pressing. When used in this fashion, post-curing times and temperatures are substantially reduced in comparison to previously known procedures with resultant improvement in the properties of the treated goods, particularly abrasion resistance and strength.

Minimum shrinkage during curing is another advantage of the present invention. With prior permanent press procedures, it has been necessary to initially prepare garments which are oversized by as much as 2–4% to accommodate shrinkage during curing and give the desired garment size. There is no need for such oversizing with the present invention since shrinkage during curing is essentially eliminated. Other advantages will also be apparent from the following detailed description of the invention.

The invention is based, in large measure, on the idea of applying a curable resin or reactant to cellulose textiles, e.g. garments or fabrics, in conjunction with a unique catalyst system wherein the actual catalyst is kept in an inhibited, inactive state except when curing is desired. According to the invention, the catalyst is activated by subjecting the textile to a combination of moisture and relatively low heat whereby curing is effected while the textile is in any desired shape or condition so that the textile retains this shape or condition after curing. For example, fabric may be processed in the flat condition during curing to give a wash-wear type product having outstanding wet and dry wrinkle recovery and other essential properties. As an alternative, fabric to which the resin or reactant and catalyst system have been applied may be made into a garment and curing then effected simultaneously with pressing of the garment to give a permanently pressed product. Combinations of these modifications may also be used. For example, partial curing may be effected with fabric in the flat condition to provide wash-wear properties with further curing of the fabric on a press after it has been formed into a garment. In another alternative, curing may be carried out in conjunction with some kind of mechanical processing means for giving a desired surface effect, e.g. calendering, embossing and schreinering. Additionally, products which have been previously shaped or given durable surface effects by the present invention may be reprocessed in accordance therewith to obtain a different shape or effect. These and other possible variations in the invention are described below.

In its broadest aspects, the invention contemplates the processing of cellulosic textiles by treating the textile with an aqueous composition containing a curable textile resin or reactant and a hydrolyzable amine or imine salt of a strong acid, particularly hydrochloric acid, drying and curing, the salt being catalytically inactive in the unhydrolyzed state but upon hydrolysis liberating the acid to serve as catalyst, the moisture content of the fabric being so controlled during drying and curing that it is adequate at the prevailing temperature to hydrolyze the salt and liberate the acid whereby the desired degree of curing is effected during these operations but is thereafter reduced to the point where the salt is in the essentially unhydrolyzed state so that curing is terminated when the textile returns to ambient conditions.

For the preparation of permanent press garments, the process may involve the following steps: padding or impregnating the fabric with a composition of the type indicated; drying (with partial curing during drying); preparing a garment from the dried fabric; and then press-curing by application of catalyst-activating heat and moisture on a conventional hot head press, Hoffman press or the like, with or without a further cure after pressing. When fabric having wash-wear properties is desired, the fabric may be simply padded or impregnated with the composition, followed by drying in the flat condition, curing occurring as the drying proceeds until the moisture content and temperature are reduced to the point where the catalyst is inactivated.

Whatever the ultimate product, i.e. durable press garment, wash-wear fabric or calendered, embossed, schreinered or otherwise surface modified textile, at least some of the curing will occur during the drying operation which follows impregnation of the textile. This is due to the fact that during impregnation the amine or imine salt is in the hydrolyzed state and curing is effected until the fabric is dried to the point where the moisture content is below that necessary to effectively hydrolyze the salt and liberate the acid. The amount of fixed resin solids (representing the degree of cure) occurring in the drying operation will vary depending on other factors, e.g. the type of product desired. Usually, however, the amount of curing at this stage is equivalent to at least 25% fixed resin solids with 40–50% preferred for best wash-wear properties.

As indicated above, it is possible to reshape a fabric or garment which has been previously shaped by means of the present invention. This may be accomplished by moistening the fabric or garment where it is to be reshaped, forming the textile into the newly desired shape and heating to cure and set the textile in this new shape. The curing conditions used for this type reshaping (i.e. moisture content, temperature and time) may be the same as or different from those previously employed.

The manner in which the invention functions to make possible reshaping of previously processed goods is not fully understood. However, it appears that the application of moisture and heat for the reshaping operation breaks down existing crosslinks resulting from previous shaping and makes possible a different crosslinking arrangement which functions to hold the textile in its new shape. Whatever the explanation, however, it will be appreciated that this embodiment of the invention has several important areas of application, for example, in the formation of cuffs in permanent press pants. Cuff formation in permanent press garments made by prior procedures has been unsatisfactory due to the inherent tendency of the goods to resist reshaping. However, the present invention eliminates this problem. All that is necessary is to moisten the cuff area of pants made according to the invention, and then press-cure the cuffs.

It will be appreciated from the foregoing that the invention herein is based on the idea of using hydrochloric acid or other strong organic or inorganic acid as the catalyst to effect the desired curing of the resin or reactant, the acid being released in situ from a compound which itself is catalytically inactive at room temperature and normal conditions of dryness but hydrolyzes with the addition of water, preferably steam, to liberate the acid. No claim is made to the use of hydrochloric acid as a curing catalyst since it is known that this material is an active catalyst even at low temperatures. However, it has not hitherto been considered feasible to use the acid as a catalyst since its curing action continues with time even without the application of heat to the point where cellulosic fibers treated therewith lose their strength very quickly and severely and become essentially useless.

In the present invention, however, the undesirable effects of hydrochloric acid are avoided while at the same time taking advantage of the catalytic activity of the acid by keeping the acid in the inhibited, essentially non-catalytic form until the desired point in the process, e.g. in the shaping operation or immediately before. At that point, the acid is released as noted earlier, to effect the necessary curing and crosslinking after which it is again effectively bound up or otherwise inhibited so that it cannot detrimentally effect the quality of the treated textile.

Representative amine or imine salts which will hydrolyze to liberate the catalytically effective acid and may be used herein are those where the amine or imine has an ionization constant $(K_b)$ of less than $10^{-5}$. This includes, for example, aniline hydrochloride, hydroxylamine hydrochloride, pyridine hydrochloride and methyleneimine hydrochloride. These salts can be added as such to the aqueous resin composition or they may be formed in situ. For example, methyleneimine hydrochloride may be made in situ by adding ammonium chloride to an aqueous solution of the resin or reactant in the presence of free formaldehyde. The ammonium chloride reacts with the free formaldehyde to form the desired imine salt according to the following reaction:

$$NH_4Cl + CH_2O(aq) \rightleftharpoons CH_2=N^+H_2Cl^- + H_2O$$

For this purpose, it is important to use at least the stoichiometric amount of $NH_4Cl$ to react with the free formaldehyde since any unreacted formaldehyde may form trimethylamine, the main constituent of undesirable fish odors and smells. Most available resins include some free formaldehyde (about 1.5–2% by weight) but it is usually necessary to add still more free formaldehyde for reaction with the $NH_4Cl$ to give enough methyleneimine hydrochloride to provide a catalytically effective amount of HCl on hydrolysis. Typically, there should be enough formaldehyde and $NH_4Cl$ present to provide from about 0.2–10% methyleneimine hydrochloride in the aqueous reactant composition applied to the fabric. This amount of methyleneimine hydrochloride is equivalent to about 0.1 to 5% HCl on hydrolysis.

Any of the conventional curing resins or reactants which are used for the treatment of cellulosic textiles to give durable surface effects, e.g. permanent press, wash-wear or the like, may be used herein. This includes, for example, the methylolated derivatives of various nitrogen-containing compounds such as urea, N,N'-ethylene urea, propylene urea, aminotriazines such as melamines and substituted melamines, triazones and urons. Combinations of these materials, for example, a mixture of polymethylolated triazine and polymethylolated ethylene urea, may also be employed.

The amount of reactant or resin which is applied to the fabric according to the invention may be widely varied and will depend on other operating factors, e.g. the fabric construction, reactant employed and the properties described in the ultimate product. However, the amount will generally be in the range of about 2–20% solids add-on based on the weight of the fabric although amounts outside this range may also be employed.

It is difficult to specify the exact amount of salt to be incorporated in the fabric to obtain the desired catalytic effect since this depends on such factors as the amount and nature of the resin employed, the salt involved and fabric composition and construction. Obviously, sufficient salt should be used to liberate enough acid to obtain the desired curing or crosslinking effect. An amount of salt sufficient to give a concentration equivalent to about 0.1 to 5% HCl in the aqueous treating composition is normally adequate although it will be recognized that amounts outside this range may be used. Usually, the pH of the treating composition is between 1–7 with a pH of about 3–5.5 preferred for best results. The treated textile, on the other hand, will generally have a pH in the range of 4–8 after impregnation and drying although this too can be varied.

In the production of permanently pressed garments involving simultaneous press-cure according to the invention, the garment may be wetted with hot water or steam by a separate step just prior to the pressing operation. However, it is preferred that the wetting and pressing operation be carried out together as, for example, by using a conventional hot head press or the equivalent. This type of press involves the initial application of a blast of steam to the fabric followed by evaporation as the pressing proceeds. The steam thus applied releases the acid by hydrolysis of the amine- or minine-salt and the thus liberated acid functions quickly and effectively to complete the resin cure. This catalytic effect continues until the moisture content and temperature of the garment is again reduced to normal in the pressing operation. At this stage, the amine or imine which has also been released as a result of the hydrolysis apparently recombines with the acid to inhibit any further catalytic effect. Conventional conditions for the hot head press, e.g. 10–60 seconds at 275° F. to 325° F. using saturated steam at the temperature indicated for from 1–15 seconds, are adequate to release and then inhibit the acid catalyst in the pressing operation and thus give a press-cure garment. If desired, the press-cured garment may be given a neutralizing treatment with a mixture of steam and ammonia as a precaution against further activity on the part of the acid and liberation of formaldehyde-based odors. However, this is not essential since odors do not seem to develop on standing and the catalytic activity of the acid appears to be effectively inhibited at ambient conditions.

In carrying out the present process, the cellulosic fabric or other textile is advantageously padded with the aqueous reactant or resin composition containing the hydrolyzable salt. Typically, the composition may contain, by weight, from 5–25% resin solids and 1 to 10% of hydrolyzable salt which in the case of methyleneimine hydrochloride is roughly equivalent to 0.5 to 5% released acid. The pick-up by the fabric is usually in the range of 40–90% although obviously the pickup, ratio of resin to salt and like details will vary widely.

During the padding or impregnation of the fabric, the salt is in a substantially hydrolyzed condition and this remains the case through the early stages of the subsequent drying operation or at least until the water content of the fabric is reduced to the point where hydrolysis no longer occurs and the acid is again bound up as the amine or imine salt. Usually, the fabric is dried to a moisture content of 2–15%, preferably 6–10%, at which point the activity of the acid has been inhibited. At this stage, 25–50% of the applied resin or reactant is already fixed to the fabric as noted earlier indicating this extent of partial curing through the drying operation. Drying is advantageously carried out at a temperature in the range of about 170–230° F., until the indicated moisture content is reached.

The invention is illustrated but not limited by the following examples wherein parts and percentages are by weight unless otherwise indicated:

EXAMPLE 1

A woven fabric comprising a blend of 50% rayon, 35% acetate, 15% nylon was padded with an aqueous composition containing 15.75% dihydroxydimethylol ethylene urea as reactant and 3.5% hydroxylamine hydrochloride. The treatment was repeated on another fabric of the same rayon/acetate/nylon content except that in this case the pad composition contained 4.5% aniline hydrochloride instead of the 3.5% hydroxylamine hydrochloride. The thus treated fabrics were dried at 200° F. to a moisture content of 2–8%, and pant legs were then made from each and pressed on a hot head press for 30 seconds at 325° F. and 80 p.s.i.g. The hot head press included an initial application of saturated steam for about 5 seconds.

After pressing, the pant legs were sewn on garment tops and laundered five times. The garments were not given any additional curing over and above that which occured in the drying and pressing operations. Surface appearance and a press crease retention for the legs made with either fabric were given a grading of 5 representing optimum results.

EXAMPLE 2

Example 1 was repeated except that the amine salt was 5% pyridine hydrochloride in one case and 9% pyridine hydrochloride in another. The resulting products were given a top rating of 5 for press crease retention and surface appearance. The products also demonstrated outstanding wet and dry wrinkle recovery characteristics as follows:

| Amine salt | Wrinkle recovery (Warp+Filling) | |
|---|---|---|
| | Dry | Wet |
| 5% pyridine hydrochloride | 304 | 200 |
| 9% pyridine hydrochloride | 296 | 226 |

EXAMPLE 3

Example 1 was repeated using a resin concentration of 13.5% solids in the bath and 1.3% hydroxylamine hydrochloride as the amine salt in one instance and 2.4% aniline hydrochloride in another. Press crease retention (P.C.), surface appearance (S.A.), wrinkle recovery and tear strength were outstanding as shown below:

| Amine Salt | P.C. | S.A. | Wrinkle Rec. (W+F) | | Tear (W/F) |
|---|---|---|---|---|---|
| | | | Dry | Wet | |
| 1.3% hydroxylamine.HCl | 5.0 | 5.0 | 299 | 213 | 5.6/4.9 |
| 2.4% aniline.HCl | 5.0 | 5.0 | 303 | 197 | 5.8/5.8 |

EXAMPLE 4

This example illustrates one way of preparing a resin formulation for use according to the invention wherein the imine salt is methyleneimine hydrochloride formed in situ by the reaction of ammonium chloride with free formaldehyde:

50 parts of $NH_4Cl$ were dissolved in 300 cc. of water. Thereafter, 15 parts of Formalin (37% aqueous) were added to the $NH_4Cl$ solution. This was followed by adding 90 parts of dihydroxy dimethylol cyclic ethylene urea solids (as well as 3 parts of free formaldehyde) to the $NH_4Cl$-formaldehyde solution while keeping the solution at a temperature below 90° F. After the dihydroxy dimethylol cyclic ethylene urea had been added, the solution was diluted with 435 parts of water to give a final treating composition containing about 18.8 parts methyleneimine hydrochloride (i.e. 1.88%). Stoichiometrically, only about 15 parts of $NH_4Cl$ were necessary to react with all of the free formaldehyde (representing the total of that included with the resin and added separately) according to the reaction equation given above. This meant that the formulation also included 35 parts excess $NH_4Cl$ (i.e. 3.5%). The amount of this excess obviously can be varied as desired by adding more or less than that used herein over and above that stoichiometrically necessary for reaction with the formaldehyde.

By omitting the separate addition of free formaldehyde in the foregoing example, and relying only on the free formaldehyde included with the urea reactant, the stoichiometric amount of $NH_4Cl$ needed for reaction with the formaldehyde was about 5.4 parts giving in turn about 0.63% methyleneimine hydrochloride or about 0.37% HCl on hydrolysis according to following equation:

$$CH_2=NHHCl + H_2O \rightarrow HOCH_2NH_2 + HCl$$

EXAMPLE 5

Three treating compositions containing 9%, 11.25% and 13.5% dihydroxy dimethylol cyclic ethylene urea and 1.88%, 1.95% and 2.1% methyleneimine hydrochloride, respectively, were prepared using the procedure described in Example 4. Fabric specimens woven with representative polyester/rayon blends (and identified as fabrics A, B, C and D) were padded with these compositions as shown in the table below.

The thus treated specimens were dried at 200° F. to a moisture content of 2–8% and pant legs were then made and pressed on a hot head press for 30 seconds at 325° F. and 80 p.s.i.g. The hot head press included an initial application of saturated steam for 5 seconds.

After pressing, the pant legs are sewn on garment tops and laundered five times. The garments were not given any additional curing over and above that which occurred in the drying and pressing operations.

The four fabric specimens had the following composition:

(A) 55% Fortrel polyester/45% rayon (T–700) plain dye.
(B) 55% Fortrel polyester/45% rayon (T–700) cross dye.
(C) 65% Dacron (T–54) polyester/35% rayon.

(D) 35% Dacron (T-35) polyester/30% Dacron (T-64)/35% rayon.

Press crease retention, surface appearance, wrinkle recovery and tear strength were highly satisfactory as shown below, wrinkle recovering being enhanced as the reactant concentration increased to 11.25% and above.

| Fabric | Reactant, percent (Solids in bath) | P.C. | S.A. | Wrinkle Rec. (W+F) Dry | Wet | Tear strength (W/F) |
|---|---|---|---|---|---|---|
| A | 9.0 | 5.0 | 5.0 | 285 | 264 | 5.0/4.8 |
| B | 9.0 | 5.0 | 5.0 | 307 | 277 | 5.2/4.0 |
| A | 11.25 | 5.0 | 5.0 | 308 | 266 | 7.6/6.9 |
| B | 11.25 | 5.0 | 5.0 | 308 | 280 | 6.5/5.4 |
| C | 11.25 | 5.0 | 5.0 | 309 | 271 | 7.9/6.9 |
| A | 13.5 | 5.0 | 5.0 | 316 | 286 | 5.8/6.3 |
| B | 13.5 | 5.0 | 5.0 | 323 | 291 | 6.0/6.0 |
| C | 13.5 | 5.0 | 5.0 | 319 | 296 | 6.6/6.7 |
| D | 13.5 | 5.0 | 5.0 | 318 | 278 | 3.7/4.0 | change occurred in garment wash and wear performance or physical properties following the prescribed post treatment with ammonia. In the case of specimens (a)–(f), the treating composition was prepared as in Example 4 and contained 9% dihydroxydimethylolethylene urea (solids basis) and 1.6% methyleneimine hydrochloride formed in situ by the addition of 6% NH$_4$Cl and 0.56% free formaldehyde over and above that included with the urea (0.30% formaldehyde). In the case of specimens (g) and (h), 9% NH$_4$Cl was used in preparing the treating composition, and the reactant concentration (solids basis) was 13.5%. This gave a methyleneimine hydrochloride equivalent of about 2.1% with about 5.5% excess unreacted NH$_4$Cl.

The following results were obtained, the indicated fabric pH representing the value obtained at the completion of the treatment:

| Fabric | P.C. | S.A. | Wrinkle Recovery (W−F) Dry | Wet | Tear (W/F) | Stoll-Flex W | F | Fabric pH |
|---|---|---|---|---|---|---|---|---|
| (a) 50/50 polyester/cotton | 5.0 | 5.0 | 289 | 285 | 8.3/6.8 | 1,000 | 463 | 4.0 |
| (b) 50/50 polyester/cotton | 5.0 | 5.0 | 286 | 291 | 8.3/6.8 | 1,000 | 1,000 | 5.3 |
| (c) 65/35 polyester/cotton | 5.0 | 5.0 | 284 | 288 | 11.8/11.3 | 1,000 | 1,000 | 3.9 |
| (d) 65/35 polyester/cotton | 5.0 | 5.0 | 308 | 296 | 11.3/10.0 | 1,000 | 1,000 | 6.0 |
| (e) 55/45 polyester/rayon | 5.0 | 5.0 | 306 | 281 | 5.5/5.0 | 1,000 | 693 | 4.3 |
| (f) 55/45 polyester/rayon | 5.0 | 5.0 | 309 | 279 | 5.0/4.0 | 1,000 | 632 | 6.1 |
| (g) 60 rayon/35 acetate/5 nylon | 5.0 | 5.0 | 281 | 208 | 5.5/4.3 | 800 | 545 | 4.1 |
| (h) 60 rayon/35 acetate/5 nylon | 5.0 | 5.0 | 277 | 206 | 5.3/4.5 | 927 | 501 | 5.7 |

EXAMPLE 6

Example 5 was repeated on polyester/cotton blends (25/75, 50/50, and 65/35) with the following results:

| Fabric | Reactant, percent (in bath) | P.C. | S.A. | Wrinkle Rec. (W+F) Dry | Wet | Tear (W/F) |
|---|---|---|---|---|---|---|
| 25/75 | 13.5 | 5.0 | 5.0 | | | |
| 50/50 | 11.25 | 5.0 | 5.0 | 303 | 290 | |
| 50/50 | 11.25 | 5.0 | 5.0 | 302 | 287 | 6.1/5.7 |
| 65/35 | 13.5 | 5.0 | 5.0 | 308 | 280 | 5.8/4.4 |

EXAMPLE 7

Example 5 was repeated on the fabric comprising the following rayon/acetate/nylon blends.

(E) 50% rayon (T-700)/35% acetate/11% nylon (T-420)+hale nylon (homespun)

(F) 50% rayon (T-700)/35% acetate/15% nylon (T-420) (rev. twist)

(G) 60% rayon (T-700)/35% acetate/4% nylon (T-420+hale nylon (fine sharkskin)

The treating bath employed was prepared as in Example 4 except that the reactant concentration was 15.75% (on a solids basis) and 90 parts NH$_4$Cl were used instead of 50 parts thus providing a bath containing about 7.5% excess NH$_4$Cl over and above that needed for reaction with the formaldehyde.

The results obtained were as follows:

| Fabric | P.C. | S.A. | Wrinkle recovery (W+F) Dry | Wet | Tear (W/F) |
|---|---|---|---|---|---|
| E | 5.0 | 5.0 | 303 | 209 | 4.1/4.2 |
| F | 5.0 | 5.0 | 288 | 205 | 4.7/3.6 |
| G | 5.0 | 5.0 | 300 | 233 | |

EXAMPLE 8

The process of Example 5 was repeated with the added feature of conditioning the garments in an ammonia atmosphere, after curing on the press. This vapor phase treatment raised the pH average 1.7 units, and could be used to neutralize the garment if this should be considered desirable for any particular situation. Essentially no

EXAMPLE 10

Six pieces of fabric composed of 50% polyester/50% Type 700 rayon, and designated as pieces 1a, 1b, 2a, 2b, 3a and 3b for convenience, were padded (60% wet pickup) with aqueous resin solutions and then dried at 200° F. The pieces designated 1a and 1b were padded with a 9% aqueous solution of dihydroxydimethylol cyclic ethylene urea (solids basis) containing no catalyst or catalyst former; pieces 2a and 2b were padded with a 9% aqueous solution of the urea reactant containing about 0.63% methyleneimine hydrochloride formed in situ by the addition of 4% NH$_4$Cl (leaving about 3.5% unreacted excess NH$_4$Cl in the solution); and pieces 3a and 3b were padded with a similar 9% solution of the urea reactant containing about 0.63% methyleneimine hydrochloride formed in situ by using 6% NH$_4$Cl so that the solution included about 5.5% unreacted excess NH$_4$Cl in addition to the imine hydrochloride. The solutions used for padding specimens 2a and 2b and 3a and 3b were prepared in the manner described in Example 4 except that in the present example no free formaldehyde was added over and above that associated with the reactant (about .3%).

Pant legs were made from each set of fabric pieces after which one sample from each set was pressed 30 seconds at 325° F., 80 pounds p.s.i.g. pressure and the other sample of each set was pressed for 60 seconds at 325° F., 80 p.s.i.g., on a conventional hot head press. The pant legs for each set were sewn onto a pair of trouser tops and washed five times in a home type launderer. The results are tabulated below:

| Specimens | Press time (sec.) | P.C. | Surface appearance | Wrinkle recovery (W+F) Wet | Dry |
|---|---|---|---|---|---|
| 1a | 30 | 5.0 | 3.5 | 229 | 281 |
| 1b | 60 | 5.0 | 4.0 | 231 | 284 |
| 2a | 30 | 5.0 | 5.0 | 264 | 305 |
| 2b | 60 | 5.0 | 5.0 | 257 | 303 |
| 3a | 30 | 5.0 | 5.0 | 264 | 303 |
| 3b | 60 | 5.0 | 5.0 | 261 | 301 |

It is to be noted that the surface appearance and wrinkle recovery for specimens 2a and 2b and 3a and 3b were significantly better than the corresponding characteristics for the control specimens 1a and 1b. Hand retention for the specimens processed according to the invention was also markedly superior. The above results further show that the additional excess $NH_4Cl$ involved in the treatment of specimens 3a and 3b did not significantly change surface appearance or wrinkle recovery (compare with specimens 2a and 2b) thus indicating that the methyleneimine hydrochloride is the essential catalyst source. This is further shown by the fact that when the excess $NH_4Cl$ was reduced to only 1.5% (by adding only 2% $NH_4Cl$ to the reactant solution), the dry and wet wrinkle recovery values measured 251 and 301, respectively. Hence, excess $NH_4Cl$ does not seem to significantly effect wrinkle recovery but it could be advantageous in providing assurance against the possibility of odor formation due to unreacted formaldehyde.

EXAMPLE 11

This example shows the superior properties of polyester/rayon fabric processed according to the invention when compared to those obtainable using a conventional prior art process.

A piece of fabric (specimen C) comprising 65% polyester (Dacron T-54) and 35% rayon and another piece (specimen D) composed of 35% Dacron T-35 polyester, 30% Dacron T-64 polyester and 35% rayon, were processed as in Example 5 using a bath containing 13.5% reactant solids. Corresponding fabric specimens were processed using the best known prior art conditions, i.e. impregnating with an aqueous composition containing 13.5% of the urea reactant and 2.16% $Zn(NO_3)_2$, pressing for five seconds in steam, baking for ten seconds, exhausting for five seconds and post-curing at 340° F. for 18 minutes. The results are tabulated below:

| Fabric | Process | P.C. | S.A. | Wrinkle recovery (W+F) Dry | Wet | Tear (W/F) |
|---|---|---|---|---|---|---|
| C | Example 5 herein | 5.0 | 5.0 | 319 | 296 | 6.6/6.7 |
| C | $Zn(NO_3)_2$ process | 5.0 | 5.0 | 321 | 289 | 5.4/4.1 |
| D | Example 5 herein | 5.0 | 5.0 | 318 | 278 | 3.7/4.0 |
| D | $Zn(NO_3)_2$ process | 5.0 | 5.0 | 320 | 283 | 3.1/3.1 |

As shown, the products made with both procedures demonstrated good press crease retention, surface appearance and dry and wet wrinkle recovery. However, tear strength of the product obtained by the present process was significantly better than the prior art product.

EXAMPLE 12

The press-cured pant legs of Example 6 (65/35 fabric) were moistened circumferentially around the bottom and then folded up where wet to provide cuffs. The cuffed portions were then pressed at 325° F. for 30 seconds on the hot head press. It was found that these cuffs retained their shape even after repeated launderings thus showing that, in contrast to prior techniques, the previously cured garment of the invention can be reshaped by moistening and curing, previous crosslinks apparently being broken to form a new crosslinked configuration.

As another illustration of reshaping according to the invention, pleated skirt fabric which had been press-cured according to the invention was moistened in the pleated area and then pressed flat on a conventional hot head press or Hoffman press. The pleats were removed and the new flat condition of the fabric was retained despite repeated launderings. Hand and surface appearance remained outstanding as did abrasion resistance, tensile and tear strength and wrinkle recovery.

EXAMPLE 13

A piece of plaid fabric (50/50 polyester/cotton) was padded with an aqueous solution containing 9% dihydroxy dimethylol ethylene urea, 1.88% methyleneimine hydrochloride and excess $NH_4Cl$ (3.5%) prepared according to Example 4. The impregnated fabric was dried to a moisture content of 2-8% and then cured in the flat condition on a Hoffman type press (15 seconds steam). The fabric was then laundered four times at 140° F. Shrinkage was measured for the fabric after curing and after the launderings (using the dimensions of the dried fabric as a starting point).

The procedure was repeated on three other pieces of the same fabric except that in one instance, curing involved pressing for 5 seconds with application of steam on the Hoffman press followed by heating for 5 minutes at 270° F. in a conventional oven; in another curing involved 15 seconds at 350° F. on the hot head press and the third involved curing for 25 seconds at 325° F. on the hot head press. The following results were obtained for surface appearance and shrinkage:

| Fabric | Cure conditions | Surface appearance | Shrinkage, percent After curing W/F | After 4 launderings W/F |
|---|---|---|---|---|
| (1) | 15 seconds steam | 4.5 | | 1.5/0.5 |
| (2) | 5 seconds steam and 5 seconds at 270° F. | 5.0 | 0.5/0.0 | 1.5/0.5 |
| (3) | 15 seconds at 350° F. on the hot head press. | 5.0 | 0.5/0.0 | 1.5/0.5 |
| (4) | 25 seconds at 325° F. on the hot head press. | 5.0 | 0.5/0.0 | 1.5/0.5 |

The above shrinkage data shows that the present invention gives minimum shrinkage during processing with resultant savings in fabric and elimination of the need for oversizing as required in hitherto known permanent press procedures to accommodate for shrinkage during curing.

The following data on dry and wet wrinkle recovery, tear and tensile strength was also obtained on the four samples processed herein:

| Fabric | | Wrinkle recovery W+F Dry | Wet | Strength Tear | Tensile |
|---|---|---|---|---|---|
| (1) | 15 seconds steam only. | 297 | 287 | 9.0/3.3 | 60/37 |
| (2) | 5 seconds steam and 5 minutes at 270° F. | 312 | 293 | 3.4/2.7 | 60/38 |
| (3) | 15 seconds at 350° F. | 305 | 272 | 3.2/2.5 | 60/45 |
| (4) | 25 seconds at 350° F. | 302 | 281 | 3.5/2.8 | 64/47 |

This data indicates that each product possessed outstanding wrinkle recovery and strength characteristics. It is to be noted that in the case of Fabric (2) which was given only a partial cure on the press and then further cured in the oven, the oven-curing conditions were much milder (5 minutes at 270° F.) than those employed in conventional oven-curing operations (as, for example, in U.S. Pat. 2,974,432). In the latter, oven-curing operations usually involve temperatures in the order of above 325° F. for 10-20 minutes whereas post-curing in an oven according to the present invention may involve treatment at temperatures of the order of 250-280° F. for 2-8 minutes. These milder conditions result in a product of much better strength characteristics than otherwise possible.

In summary, it will be appreciated from the foregoing that the invention contemplates a catalytic system which is capable of curing a textile resin or reactant comprising a self-inhibiting salt of a weak base and a strong acid capable of disassociating in the presence of moisture and heat to controllably liberate the strong acid for catalysis and then recombining when dry to become a neutral salt. This system may be used in a variety of ways. Thus, it may be employed to produce a wrinkle resistant, cellulosic textile by treating the textile with an aqueous resin or reactant composition containing the salt of a weak base/strong acid, drying, shaping as desired, wetting and then curing while maintaining the desired shape. The invention may also be used to reshape an article previously cured and processed in the manner described by rewetting the article to redisassociate the self-inhibited salt, and then recurring while maintaining a desired new shape so that previous resin or reactant bonds are broken and reformed. Further modifications include curing fabric in the flat state or in the pleated or creased state. Goods may be embossed, calendered or similarly processed using the instant invention and, as emphasized above, garments may be permanently shaped on a garment press with further post-curing, if desired, in conventional type ovens. As indicated above, the invention makes it possible to use lower curing temperatures and shorter times than hitherto possible with crosslinking and curing at relatively high moisture content so that the products which are obtained not only possess durable surface effects, e.g. press crease retention, but also demonstrate other outstanding characteristics such as tear and tensile strength and abrasion resistance. Other advantages of the invention are disclosed above or will be apparent to those in the art.

Various modifications may be made in the invention described above. Thus, for example, it will be recognized that the resin or reactant formulations used herein may be modified to include conventional type softeners and/or hand builders and any other chemicals that might be needed to achieve a desired hand. Other variations may also be made in the invention as exemplified above without deviating from the scope thereof as defined in the following claims.

We claim:

1. In a process for obtaining a durable press finish effect on a cellulosic textile which comprises impregnating the textile with an aqueous composition containing a durable press textile resin or reactant which is curable in the presence of hydrochloric acid followed by drying and curing the fabric in the shaped condition in the presence of said acid; the improvements which comprise (a) including in said aqueous composition methyleneimine hydrochloride, same being catalytically inactive in the unhydrolyzed state but upon hydrolysis liberating said hydrochloric acid to serve as catalyst, and (b) controlling the moisture content during said drying and curing so that said content is initially adequate to hydrolyze said salt and liberate the acid whereby a desired degree of curing is effected but is thereafter reduced to the point where the acid is deactivated by reforming the salt in the essentially unhydrolyzed state and curing is terminated when the textile is returned to ambient conditions.

2. In a process for obtaining a durable press finish effect on a cellulosic textile which comprises impregnating the textile with an aqueous composition containing a durable press textile resin or reactant which is curable in the presence of hydrochloric acid followed by drying and curing the fabric in the shaped condition in the presence of said acid; the improvements which comprise (a) including in said aqueous composition a hydrolyzable amine or imine salt of said acid catalyst, said salt being selected from the group consisting of aniline hydrochloride, hydroxylamine hydrochloride, pyridine hydrochloride and methyleneimine hydrochloride, and being catalytically inactive in the unhydrolyzed state but upon hydrolysis liberating said hydrochloric acid to serve as catalyst, and (b) controlling the moisture content during said drying and curing so that said content is initially adequate to hydrolyze said salt and liberate the acid whereby a desired degree of curing is effected but is thereafter reduced to the point where the acid is deactivated by reforming the salt in the essentially unhydrolyzed state and curing is terminated when the textile is returned to ambient conditions, said textile being neutralized after curing by treatment with ammonia vapor.

References Cited

UNITED STATES PATENTS

| | | | |
|---|---|---|---|
| 2,795,513 | 6/1957 | Rossin | 8—116.3 XR |
| 2,950,553 | 8/1960 | Horwitz | 38—144 |
| 2,789,379 | 4/1957 | Edwards | 38—144 |
| 3,025,622 | 3/1962 | Hilton | 38—144 |

JOHN D. WELSH, Primary Examiner

U.S. Cl. X.R.

8—116.3